Jan. 26, 1926.  1,571,124
A. KOLKO
MIXING VALVE FOR AIR AND COMBUSTION GASES
Filed March 31, 1921   2 Sheets-Sheet 1
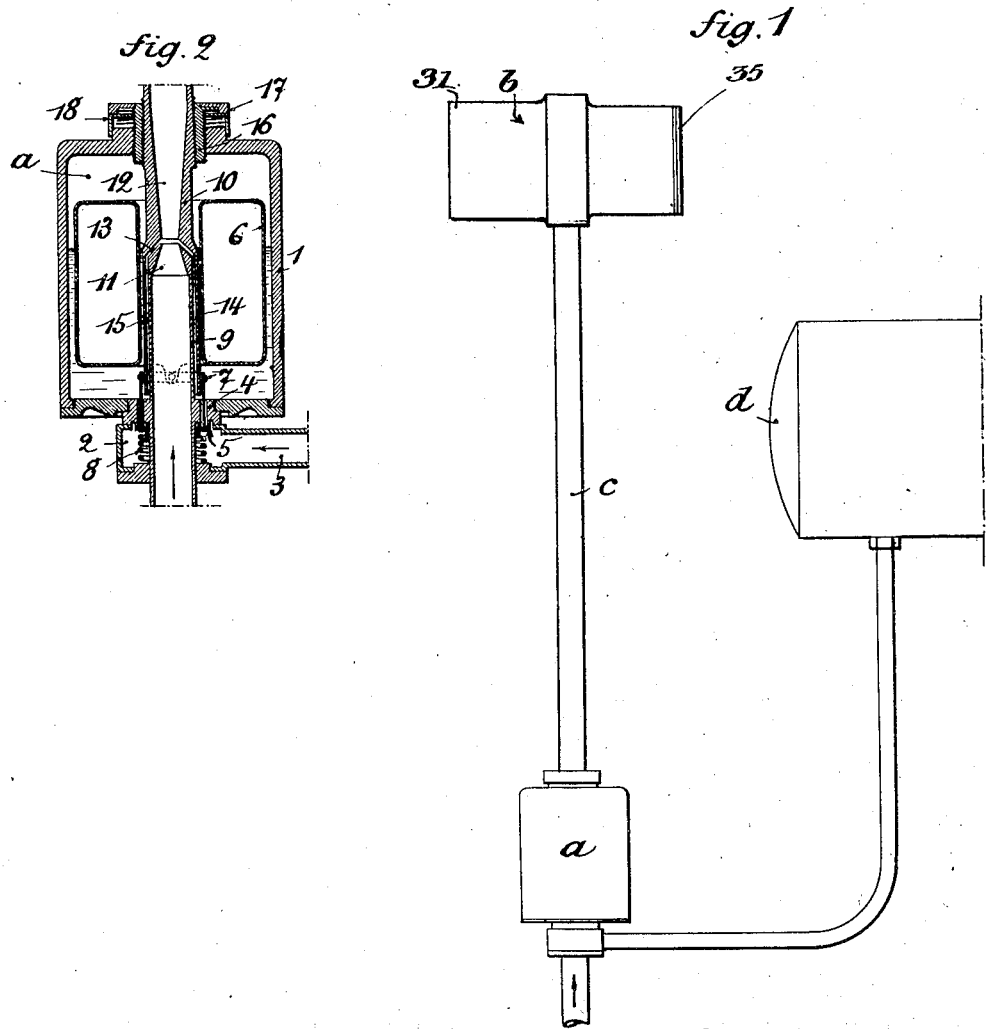
Inventor
Aron Kolko
By H. B. Willson & Co.
Attorneys

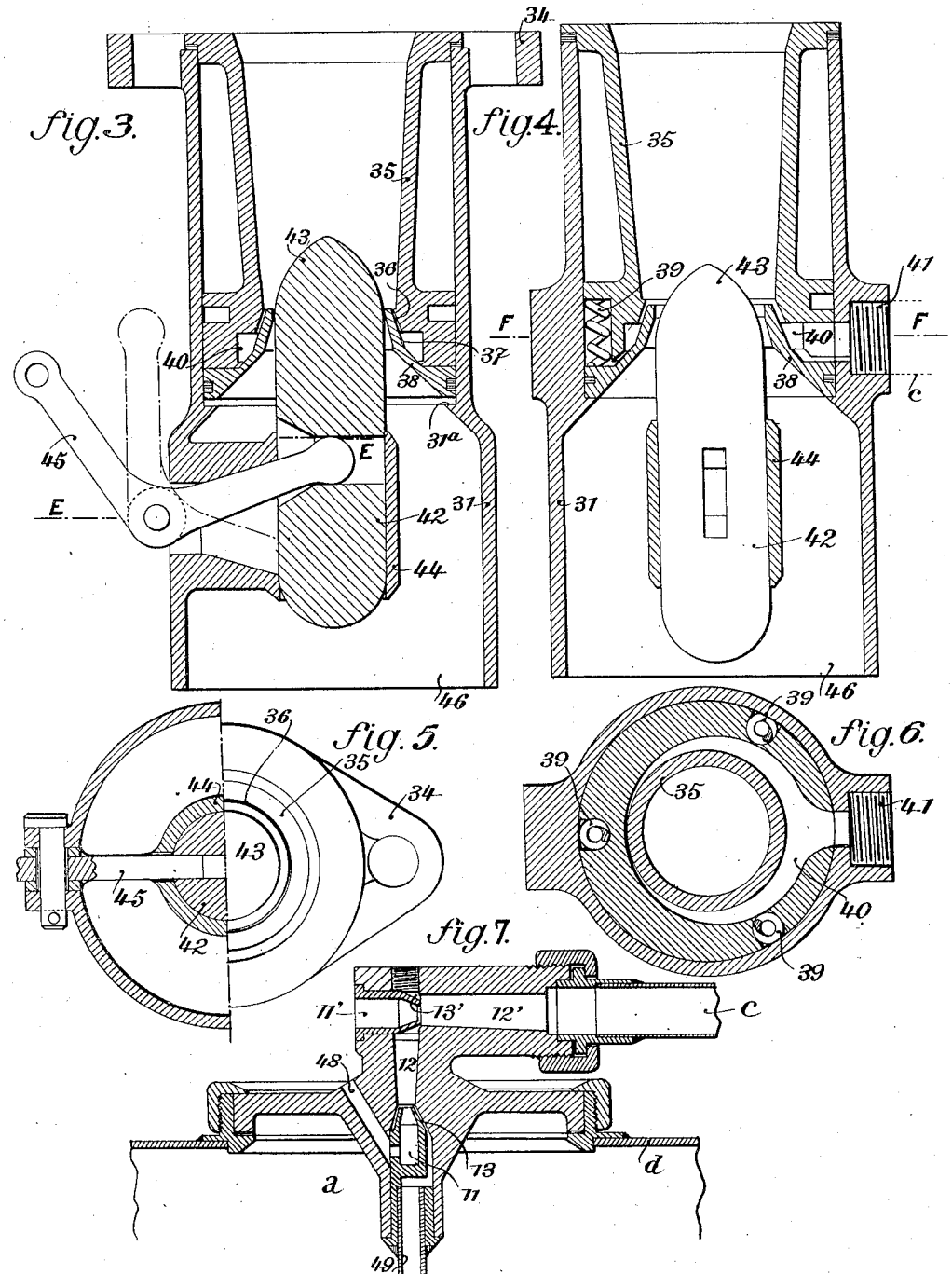

Patented Jan. 26, 1926.

1,571,124

UNITED STATES PATENT OFFICE.

ARON KOLKO, OF COLOMBES, FRANCE.

MIXING VALVE FOR AIR AND COMBUSTION GASES.

Application filed March 31, 1921. Serial No. 457,475.

*To all whom it may concern:*

Be it known that I, ARON KOLKO, a citizen of the Republic of France, and residing at Colombes, Seine Department, in the Republic of France, have invented certain new and useful Improvements in Mixing Valves for Air and Combustion Gases, for which I have secured French Patent No. 498,020 of July 19, 1918, and the addition of Oct. 15, 1919, on the same, and of which the following is a specification.

This invention relates to mixing valves for carburetting apparatus for internal combustion engines.

It has been proposed to construct carbureters composed of two different parts connected together by piping of small diameter having a variable length according to the case, the first part constituting a constant level float-feed chamber and the second part a carbureter.

In known devices the fuel is supplied to float-feed chamber by reason of the partial vacuum produced by the engine suction. This type is used in cases where all its parts are disposed at a higher level than the fuel tank. The present invention relates to a mixing valve forming a distinct part connected by piping of small diameter; to a carbureter the latter being provided with a chamber in which is preliminarily formed a strong fuel mixture, the mixing valve serves to add to the mixture a suitable quantity of air and to regulate the flow to the engine. These parts are constructed so as to obtain a high vacuum and to eliminate the butterfly valve or like throttle.

The part forming the carbureter may be entirely separate from the engine and may be placed at any suitable point as the constructor may desire.

It may be placed in the lowest position which may be necessary with reference to the fuel supply tank for the purpose of providing a sufficient liquid fuel pressure upon the nozzle, thus obviating the use of pressure tanks and the inconveniences thereof. It can even be placed next to the second part.

The accompanying drawings show by way of example several constructional forms of the mixing valve according to this invention.

Figure 1 is a diagrammatic elevation of the valve and the carbureter.

Fig. 2 is a vertical section of the carbureter.

Figs. 3 and 4 are central longitudinal sections of the gas mixer taken on planes at right angles to each other, and showing two different positions of the regulating device.

Fig. 5 is an end view with parts broken away and in section the plane indicated by the broken line on E—E of Fig. 3.

Fig. 6 is a cross sectional view taken on the plane of the broken line F—F of Fig. 4.

Fig. 7 is an axial section of another constructional form of the carbureter.

The apparatus here represented essentially comprises a carbureter $a$ and a mixing valve $b$ which are connected together by the piping $c$ (Fig. 1).

The said carbureter comprises the following parts:

1. The main body of the tank, 1.
2. The lower part of the tank, 2, into which the liquid fuel is admitted through the neck 3, said fuel entering the interior of the tank through annular orifices 4 controlled by a poppet valve 5 also of annular form and having a double seat.
3. The float 6, which actuates the annular poppet valve 5 by means of a universal joint device 7 and two links $7^a$ providing in all cases the proper actuating effect even where the axis of the float makes a certain angle with the axis of the tank; the weight of said float added to that of the poppet valve is equilibrated in great measure by a spiral spring 8 placed directly under the poppet valve, whereby the device is rendered very sensitive to variations of the liquid fuel level.
4. A connecting tube in two parts 9, 10, passing entirely through the tank along the axis thereof; the lower tube 9 is connected directly with the outer air at the lower end thereof and ends at the top in a hollow truncated cone shaped portion 11. The fastener $3^a$ for the inlet neck fits upon the tube 9 beneath the inlet neck and supports the neck in the desired position. The upper tube 10 is connected at the top with the piping $c$ leading to the mixing valve $b$, while the lower part of said tube ends in an inverted hollow conical portion 12 which is more elongated than the truncated cone shaped portion 11 of the lower tube, the assemblage of said conical parts constituting a venturi.

The tubes 9 and 10 are so disposed as to leave at their ends an opening 13 which serves for the passage of liquid fuel under suction from the motor.

The upper tube 10 is extended downwards to within a few millimetres of the bottom of the tank by means of a tube 14 with thinner walls surrounding the lower tube, a small opening 15 being provided between the two tubes.

5. The upper part of said tank, which constitutes a very exact regulating device for liquid fuel supply whereby the carburetting apparatus may be adjusted once for all for each motor, or for making various corrections for altitude, temperature, hydrometric state, and the like. It contains a hollow stopper 16 screwed into the main body of the tank, the interior portion of said stopper being screw-threaded with a slightly different pitch from that of the outer screw-thread and is screwed upon the upper part 10 of the nozzle tube. The said stopper may rotate, but the tube 10 can only move endwise, whence it results that for a complete revolution of the stopper the nozzle tube will move endwise by a quantity equal to the difference between the two pitches of the stopper 16 or for instance 0,25 millimetre. If on the other hand the head 17 of said stopper is provided with 100 teeth in resilient engagement with 100 corresponding notches of an oppositely disposed head 16, the height of the orifice of said nozzle may be regulated within $$\frac{0,25}{100} = 0,0025 \text{ millimetres.}$$

The mixing valve, designated by $b$ as a whole, and shown in detail in Figures 3 to 6 comprises a hollow member 31 having one end open to the outer air while the other end, provided with a flanged member 34 is adapted for connection with the suction piping of the motor. Into the latter end of the member is inserted the diverging portion 35. The admission end of said portion 35 constitutes a conical seat 36 into which is fitted a corresponding portion 37 of the converging portion 38 of the diffusing device, this latter portion or nozzle being movable endwise and impelled by the springs 39 which tend to maintain the same against a shoulder 31ª provided in the member 31. The annular space 40 between the base of the fixed part 35 and the movable nozzle 38 may be connected through the neck 41 with the passage $c$ which introduces the rich fuel mixture coming from the carburetting apparatus.

A cut-off device is movable along the axis of the diffusing device, and comprises a cylindrical portion 42 and a conic or ogival pointed portion 43, the diameter of the portion 42 being but slightly smaller than the minimum inner diameter of the nozzle 38. The said cut-off device is guided in a socket 44 secured to the member 31 and actuated by the lever 45. The movable nozzle 38 of the diffusing device is displaced automatically under the influence of the variable depression set up by the motor and acting against the pressure of the springs 39.

From the disposition of the cut-off device 42, 43 in front of the diffusing device, and the shape of the former; it results that the depression, at the point where the carbureted gas arriving through 41 becomes mixed with the air admitted through 46, is a maximum when the motor is at the extreme slow speed point. The cut-off device then occupies the position shown in Fig. 3, the depression being reduced as the cut-off is displaced in the direction of the open position shown in Fig. 4. If the width of the passage between the parts 35 and 38 were invariable, the mixture would be too rich at the slow speed and would become poorer as the motor speed increased above the normal rate. This variation in compositon is corrected by the automatic displacement of the nozzle 38 which reduces the gas passage as the depression becomes greater.

On the other hand, in case for a given position of the cut-off device the motor speed should decrease by reason of an increase in the resistance couple, the depression will be lowered and the mixture will become too poor if at the same time the automatic movement of the nozzle 38 did not properly increase the section of passage of the rich gas, at the same time reducing the air passage around the cut-off device. The contrary effect will be produced if a diminution of the resistance couple causes an increase in the motor speed. From the above, it will result that the motor possesses a great flexibility of operation. The starting action and the extreme slow speed are obtained with great facility.

It may be found advantageous to mount a valve or cock upon the gas piping to obtain the immediate reducing action by means of the motor, and the amount of this action may be regulated by more or less opening or closing said valve. Should it prove impossible to place the carburetting device $a$ at a lower point than the gasoline supply tank $d$, by reason of the fact that this latter is situated too low with reference to the motor (for instance where the tank is mounted in the rear of the vehicle frame) or for any other reason, the carburetting device $a$ may be located higher than the carburetant level in the tank, but without requiring the use of pressure upon the latter.

To this effect, the portion $a$ may comprise a plurality of converging and diverging nozzles so combined as to set up a strong depression and to provide in all cases a suitable suction on the fuel irrespectively of the variations of level of this latter in the tank.

Fig. 7 indicates a device of this nature wherein the depression is set up by means of two converging and diverging nozzles whereof one 11, 12, 13 is mounted vertically upon a fuel tank $d$ and the other 11', 12', 13' is disposed above the same and in the horizontal position. The suction effect of the motor in the passage $c$ causes a flow of air through 11' and a strong depression in the annular space around the conical part 13'. This depression produces in the lower nozzle a flow of air through the part 11 which is connected with the outside of the tank by a passage 48, and the current thus produced sets up a strong depression in the annular space around the conical part 13 connected with the fuel tube 49 extending to the bottom of the tank $d$. The orifices are so adjusted that the quantity of fuel drawn in shall constitute with the air admitted through 11 and 11' a rich mixture, and that the depression prevailing about the part 13 shall be very considerable in proportion to the hydrostatic pressure corresponding to the maximum and minimum differences of level of the liquid with reference to the mean level in the tank.

This depression may in fact attain a value equal to 7 to 8 metres of water, whereas the variations of level in the reservoir are practically limited to 15 centimetres approximately about the mean level, or less than 2% of the depression. This difference is negligible in comparison with the variations which are due to outside conditions.

Claim—

A mixing valve for air and a combustible gas comprising a cylindrical casing adapted to be connected to the intake of an internal combustion engine, a Venturi tube mounted in this casing, a conical tube having its smaller end inserted within the throat of said venturi and movable under the suction of the engine, spring means tending to separate the conical tube from the Venturi tube, means for supplying a combustible gas to the annular space between said Venturi tube and said conical tube, a plug movable along the axis of said casing and having an end of converging form adapted to close the opening of the conical tube, and means for adjusting the position of said plug.

In testimony, that I claim the foregoing as my invention I have signed my name.

ARON KOLKO.